United States Patent

Goodson et al.

[11] Patent Number: 5,702,244
[45] Date of Patent: Dec. 30, 1997

[54] APPARATUS AND METHOD FOR REDUCING PARTICULATE EMISSIONS FROM COMBUSTION PROCESSES

[75] Inventors: David B. Goodson, Mill Creek; Robert N. McRuer, Seattle, both of Wash.

[73] Assignee: Thermal Energy Systems, Incorporated, Woodinville, Wash.

[21] Appl. No.: 490,597

[22] Filed: Jun. 15, 1995

Related U.S. Application Data

[63] Continuation-in-part of Ser. No. 260,096, Jun. 15, 1994, abandoned.

[51] Int. Cl.⁶ .................. F23B 7/00; F24C 1/14
[52] U.S. Cl. .................. 431/2; 126/500; 126/77
[58] Field of Search .................. 431/2; 123/536; 126/500, 515, 516, 517, 518, 77

[56] References Cited

U.S. PATENT DOCUMENTS

| | | |
|---|---|---|
| 1,153,182 | 9/1915 | Schniewind. |
| 2,604,936 | 7/1952 | Kaehni et al.. |
| 3,087,472 | 4/1963 | Asakawa. |
| 3,224,485 | 12/1965 | Blomgren, Sr. et al.. |
| 3,306,338 | 2/1967 | Wright et al.. |
| 3,416,870 | 12/1968 | Wright. |
| 3,503,348 | 3/1970 | Dvirka. |
| 3,749,545 | 7/1973 | Velkoff. |
| 3,841,824 | 10/1974 | Bethel. |
| 3,869,362 | 3/1975 | Machi et al.. |
| 4,052,139 | 10/1977 | Paillaud et al. .......... 123/536 |
| 4,111,636 | 9/1978 | Goldberg. |
| 4,118,202 | 10/1978 | Scholes. |
| 4,260,394 | 4/1981 | Rich. |
| 4,304,096 | 12/1981 | Liu et al.. |
| 4,340,024 | 7/1982 | Suzuki et al. .......... 123/536 |
| 4,649,260 | 3/1987 | Melis et al.. |
| 4,675,029 | 6/1987 | Norman et al.. |
| 4,903,616 | 2/1990 | Mavroudis. |
| 4,987,839 | 1/1991 | Krigmont et al.. |

FOREIGN PATENT DOCUMENTS 649168  11/1962  Italy.

OTHER PUBLICATIONS

Burtscher, H., "Measurement and Characteristics of Combustion Aerosols with Special Consideration of Photoelectric Charging and Charging by Flame Ions", *J. Aerosol Sci.*, vol. 23, No. 6, pp. 549–595, 1992.

*Primary Examiner*—Carl D. Price
*Attorney, Agent, or Firm*—Christensen O'Connor Johnson & Kindness PLLC

[57] ABSTRACT

A method and apparatus for reducing particle emissions from combustion processes and increasing combustion efficiency. A high voltage electrical potential is passed through a combustion flame to agglomerate particles, which are then removed from the exhaust gases through combustion or deposition on nearby surfaces of the apparatus. It is believed that application of high voltage electrical potential increases movement of the ions and free electrons within the combustion flame, causing increased oxygen mixing, and combustion efficiency. In one embodiment of the invention, a high voltage electrical potential is applied to the combustion flames of a wood stove and secondary air is supplied in the vicinity of the upper periphery of the flames. Application of the high voltage electrical potential and secondary air dramatically reduces particle emissions produced by the wood stove.

17 Claims, 11 Drawing Sheets

APPARATUS AND METHOD FOR REDUCING PARTICULATE EMISSIONS FROM COMBUSTION PROCESSES

STATEMENT OF RELATED APPLICATIONS

This application is a continuation-in-part of pending U.S. application Ser. No. 08/260,096, filed Jun. 15, 1994 now abandoned.

FIELD OF THE INVENTION

The present invention relates to methods and apparatus for decreasing particle emissions in combustion processes and for increasing combustion efficiency; specifically, the present invention relates to methods and apparatus for decreasing the particle emissions from and increasing the combustion efficiency of equipment for combustion of solid, liquid, or gaseous fuel.

BACKGROUND OF THE INVENTION

Combustion of fossil fuels, garbage, wood byproducts, et cetera, produces harmful particle emissions that are one of the major contributors to air pollution. Particle emissions are present in all combustion processes, including highly regulated applications such as automotive and diesel engines, waste incineration facilities, electrical power plants, Dutch ovens used in the pulp and paper industry, et cetera. Many of the particles produced during the combustion process are ultrafine particles that may have an effect on human health and yet cannot be removed by ordinary filtering methods.

One source of particle emissions is fireplaces, and wood or pellet stoves that are used in personal residences, such as homes or apartments. Although ordinary open fireplaces produce the highest level of particle emissions, wood or pellet stoves also contribute to the production of potentially harmful particle emissions.

Wood and pellet burning stoves have been targeted by federal, state, and local governments for improvement in the mount of particle emissions or for total elimination. A number of state and local governments have passed strict regulations on the particle emissions of wood and pellet stoves that have basically eliminated them from the marketplace.

The U.S. Environmental Protection Agency (EPA) has also passed regulations that mandate a reduction in the mount of particle emissions from wood or pellet stoves, set forth in 40 CFR Part 60. The EPA is expected to pass even stricter regulations on particle emissions in the future.

In order to meet EPA standards on particle emissions, wood stove manufacturers have expended a large amount of time and money researching new ways to lower the quantity of particle emissions produced. Some improvements resulting from this research have been to burn the wood at higher temperatures and to provide increased oxygen to the combustion zone using fans or added air ducting in order to get more complete combustion.

Another improvement developed in recent years has been the use of "pyrolytic wood stoves." In a pyrolyric wood stove, the wood is burned at reduced oxygen levels and at extremely high temperatures that cause the wood to produce gases. Secondary air ducts are provided above the wood combustion zone to provide additional oxygen to mix with the gases coming off the wood to complete the combustion process. The mixing of oxygen and gases creates a secondary combustion zone above the primary combustion zone. The secondary combustion zone reburns particles created in the primary combustion zone, increasing combustion efficiency and decreasing particle emissions.

Improvements to wood stoves developed to this date have reduced particle emissions; however, the degree to which particle emissions can be reduced using current technology is limited. As state and EPA particle emissions regulations become more stringent in the future, it will become difficult, if not impossible, to meet the new regulations using current technology.

One method used to reduce particle emissions from commercial incinerators is the installation of high voltage electrical precipitators in the exhaust ducting from the incinerator. High voltage electrical precipitators help to reduce particle emissions by acting on particulates carried over from the combustion process in the exhaust gases, but they do not directly influence the combustion process. An example of such a precipitator is disclosed in U.S. Pat. No. 3,503,342, issued to Dvirka. In high voltage electrical precipitators, electrodes are placed in the exhaust flow path from the combustion chamber. A high voltage electrical potential is applied to a first set of electrodes in the exhaust gas flow path to impart an electrical charge to the ash flowing through the exhaust ducting. A second set of high voltage electrodes charged with the same electrical potential is located in the exhaust ducting downstream from the first set of electrodes. The second set of electrodes repels the charged ash in order to force the ash out of the flow stream into a collector, thus helping to reduce particle emissions.

An electrical potential has been applied to electrodes placed on either side of a propane flame to extract $NO_x$ pollutants from the combustion process. The extracted $NO_x$ is then used in the production of nitrous fertilizer, as described in U.S. Pat. No. 4,111,636, issued to Goldberg. In Goldberg, electrodes positioned 15–20 cm apart on either side of, but not touching, the propane flame were energized with a voltage of 800 to 900 volts to achieve a maximum reduction of NO and $NO_2$ in the flue gas. The $NO_x$ pollutants were extracted from the propane flame by attracting naturally produced positively charged $NO_x$ ions to a negatively charged electrode. While it is disclosed that it was previously known that electrical fields of as low as one to two volts per centimeter would affect $NO_x$ emissions, no reference is made to any effect on particulate emissions.

A method to reduce particle emissions from combustion sources effectively and inexpensively would assist in lowering pollution and improving air quality. Such a method would be even more beneficial if it could increase combustion efficiency and heat transfer at the same time that it decreased the production of particle emissions.

SUMMARY OF THE INVENTION

The invention provides apparatus and methods for the removal or reduction of particulate levels in combustion byproduct gases produced in a combustion process. In accordance with the invention, flames of the combustion process are subjected to a high electrical field, thereby resulting in a reduction in the quantity of particulates carried from the combustion process in combustion byproduct gases. According to the invention, secondary combustion air is admitted to the flames of the combustion zone near an electrode providing the electrical field. This secondary combustion air further facilitates combustion of and reduction of particulate emissions.

As best understood, combustion is electrical and chemical in nature and naturally produces varying amounts of ions, free radical compounds, and electrons. Particulates, such as particles of unburned fuel, byproduct gases including CO and $CO_2$, water, carbon, and other products, are also produced, depending upon the fuel being combusted. Particle emissions and particle size distribution for all types of fuel are heavily influenced by the amount of oxygen present during the combustion process.

Much of the particulate matter created during combustion is ultrafine and cannot be removed by current filtering methods. The number of ultrafine (submicron-sized) particles produced during combustion is generally in centimeter. During the combustion process, many of these particles become attached to ions naturally produced during the combustion process. The ions attached to the particles impart a net charge to the particles.

In addition to producing ions, combustion also produces a corresponding amount of free electrons. These free electrons will preferentially attach to oxygen molecules due to the high electron affinity of oxygen-bearing species located in the combustion zone.

The present invention takes advantage of the electrical nature of combustion to reduce particulate emissions from all types of gaseous, solid, or liquid fuel combustion applications, including wood stoves, waste incinerators, Dutch ovens, power generation plants, internal combustion engines, et cetera. In accordance with the present invention, the combustion process is electrically augmented by applying a high voltage electrical potential through the combustion zone. This high voltage electrical potential affects the nature of the combustion process.

As best understood, it is theorized without being bound, that one of the effects of applying a high voltage electrical potential to the combustion zone is to increase the rate of creation of ions and free electrons. The high voltage electrical potential also increases the rate of movement of ions, free electrons and charged particles present in the combustion zone. This increased rate of movement and relocation of the charged particles, ions, and free electrons increases the mixing of oxygen molecules and combustible gases within the combustion zone, resulting in more efficient, chemically balanced burning with reduced particle emissions.

It is further so theorized that application of a high voltage electrical potential through the combustion zone also enhances the agglomeration of submicron particulate matter within the combustion zone. Increased movement and mixing in the combustion zone increases interparticle interactions that lead to particle agglomeration. A high voltage electrical field acting on the charged particles in the combustion zone can cause particles to remain in the combustion zone for a longer period of time, thus allowing the natural chemical, electrical combustion process more time to agglomerate submicron particles into larger particles or clumps of particles. These larger clumps of particles remain in the combustion zone or fall to the bottom of the combustion zone, resulting in further combustion of the particles. Further combustion of the particles increases the efficiency of the combustion process and also results in a more complete combustion of the fuel and particulate matter, decreasing particle emissions. Larger particles may also be more easily and economically removed from the exhaust gases by filtering.

Application of a high voltage electrical potential through the combustion zone also increases combustion efficiency by helping to break down hydrocarbons in the combustion zone. As discussed above, application of a high voltage electrical potential increases the movement and thus kinetic energy of the ions, free electrons, and charged particles within the combustion zone. This increased kinetic energy of the ions, flea electrons, and charged particles results in an increased number of collisions between hydrocarbon molecules and the ions, free electrons, or charged particles. The increased numbers of collisions and more energetic collisions break down the hydrocarbon molecules, resulting in a more complete chemical reaction, which releases more reactants for combustion.

The overall effect of the present invention, regardless of theoretical analysis of physical phenomena, is to increase the efficiency of the combustion process so that the quantity of particles in exhaust combustion gases is decreased. Thus, emission of particulates in the size range 0.1 to 3 microns is reduced by about 50 to 60 wt %, while larger particulates are reduced by about 20 to 30 wt %. In addition to decreasing the quantity of particles produced, the present invention also uses the high voltage electric potential to extract particles from the exhaust gases produced during combustion.

As discussed above, applying a high voltage electrical potential through the combustion zone increases the production of ions and free electrons in the combustion zone. These ions and free electrons tend to be attracted to and attach to submicron particles in the combustion zone thus giving the particles a net charge. Net negatively charged particles may remain associated to the fuel source where they grow in size by a polymerization-type process. Ultimately, the polymerized particles are combusted. Charged particles are also extracted from the combustion zone and exhaust gases using a high voltage potential described below.

Particles are removed by attracting the ionized or charged particles to an oppositely charged electrode located near or within the combustion zone. Such an electrode could be the housing of the wood stove, the secondary air supply tubes used in pyrolyric stoves, collection chambers specifically designed to collect particles, et cetera. Alternatively, an electrode charged with the same electrical potential as the ions and charged particles could be used to repel the ions or charged particles into a collection chamber, steer the charged particles back through the combustion zone, or contain the charged particles in the combustion zone.

In addition to increasing efficiency and decreasing particle emissions, the present invention also uses a high voltage electrical potential to increase heat recovery from combustion by heat transfer from particles produced by the combustion process to adjacent surfaces, such as interior surfaces of the housing of a wood stove. Particles produced during combustion contain a fraction of the total heat energy produced. This heat energy is normally lost as the particles exit the stove through exhaust ducts. The present invention attracts the hot particles to the interior surface of the wood stove thus causing the heat energy from the particles to be transferred into the stove's housing. Charged particles and ions are attracted to the housing by placing an electrical potential, opposite that of the charge of the ions and charged particles, on the interior surface of the stove. The opposite electrical potential, or ground, attracts the charged particles and ions to the interior surface of the stove where they release heat to the stove surface resulting in a hotter stove exterior surface, which is better able to transfer heat to the surrounding environment. The invention thus increases heat transfer between the housing and the surrounding environment.

The efficiency of the heat transfer rate between the combustion zone and the wood stove housing, and the efficiency of the combustion process and particle removal process are dependent upon the field produced and may be optimized by selecting the location(s) at which a high voltage electrical potential is applied.

Application of the present invention to an exemplary wood stove has reduced particle emissions substantially over the same stove without application of the invention. Application of the present invention is not, however, limited to wood stoves. It may also be applied to propane or natural gas stoves, waste incinerators, waste wood boilers, Dutch ovens used in the pulp and paper industry, power generating plants, or other combustion processes. In addition, the present invention may be placed in an exhaust gas duct to reduce particle emissions from internal combustion engines such as those used in automobiles or trucks.

In one embodiment the invention provides an insert for fireplaces that reduces particulate emissions and improves efficiency. The insert has an electrically grounded base portion, comprising a plenum with air inlets for receiving inlet air, surfaces for transferring heat to the inlet air, and outlets for supplying heated inlet air to a combustion zone, located above the base portion, as primary combustion air. An electrically charged roof portion of the insert is supported above the base by electrically insulative vertical hollow supports so that the roof is elevated to a level in touching relationship with upper edges of flames in the combustion zone. Thus, an electrical field is created between the charged roof and the grounded base of the insert. Further, the interior of the plenum is in fluid communication with an interior portion of the roof through the hollow vertical supports. The roof is supplied with holes to direct heated air, transmitted from the base via the supports, to the flames as secondary combustion air.

In another embodiment, the invention provides an improved secondary combustion air supply apparatus that results in reduced particulate emissions. The air supply header is electrically insulated from the furnace or boiler and is electrically charged to a high voltage relative to a base of the furnace or boiler, beneath the combustion zone, that is electrically grounded. The combustion zone, subjected to a high electrical field strength, produces less particulates.

In another embodiment, the combustion zone of an industrial fuel burner, such as a coal, oil, or gas burner, is subjected to an electrical field and supplied with secondary combustion air to reduce particulate emissions. A base of the burner, below the combustion zone, is electrically grounded. A hollow perforated electrically charged secondary air ring, supported by electrically insulative supports, supplies secondary air to the combustion zone. The ring is located at an upper edge of the flame of the combustion zone so that the time is subjected to the potential difference between the ring and the grounded burner base.

As indicated above, the invention is applicable to wood burning stoves. In these stoves, a base portion below the flames of the combustion zone is electrically grounded. The charged upper electrode portion, near the top of the flames, may be of a variety of structural shapes and is preferably able to convey secondary combustion air to the combustion zone, and provide an acceptable amount of drag on combustion byproduct gases so that pressure drop is not prohibitively high. Thus, the upper portion may be era hollow perforated disc shape, a grid of hollow tubes, and the like.

Another embodiment of the invention is a method and apparatus for reducing particle emissions from a combustion process by first combusting a fuel source to produce a combustion flame within a combustion zone. A high-voltage electrical field is applied through the combustion zone across the time, preferably from the top to the bottom of the flame, to reduce the amount of particles leaving the combustion zone.

In accordance with other aspects of the invention, an alternating potential electrical field is applied through the combustion zone. The combustion zone could be located within a stove and the fuel source could be selected from wood logs, wood pellets, natural gas, propane gas, wood pulp, or organic waste products.

In other embodiments of the invention, a high voltage electrical potential is applied to one or more electrodes located above the fuel source. Opposing high voltage electrical charges are applied to one or more of the electrodes to produce a strong electrical field. The electrical field produced can be used to force particles produced during combustion of the fuel source into the flame or into a collection chamber. Generally, a high voltage electrical potential of greater than about 150/Vcm is applied to the electrodes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention may be used in a number of different applications that use a combustion process, including wood stoves, waste incinerators, electrical power plants, internal combustion engines, et cetera. Embodiments of the invention as applied to a wood stove, a fireplace, a burner, and to an exhaust from an internal combustion engine are described below. The embodiments described herein are not meant to be limiting and the present invention may be readily applied to other combustion applications by one skilled in the art who has read this description.

The invention combines the application of a high strength electrical field through a flame in a combustion zone with provision of secondary combustion air to the flame, in the vicinity of a charged electrode, to reduce particulate emissions.

In the specification and claims, the term "high strength" as qualifying an electrical field means a field having a strength of at least about 150 V/cm, preferably 300 to 1200 V/cm and most preferably 800 to 1200 V/cm. Required field strength may vary depending upon the temperature of the flame. However, when the flame is about 1000° C., then the field strength may be in the range 500 to 800 V/cm, for best results. It is preferred that the field be produced between a negatively charged electrode, located at an upper edge and in touching relationship with the flames, and a grounded base below the flames. However, the field may also be produced by alternating the charge of the electrode, which is in touching relationship with flames, or by providing it with a positive charge.

It has also been found that to maintain an electrical field across the combustion zone requires only modest energy input—0.001 watt/BTU, depending upon temperature of the flame and the applied voltage.

Figure 1A:
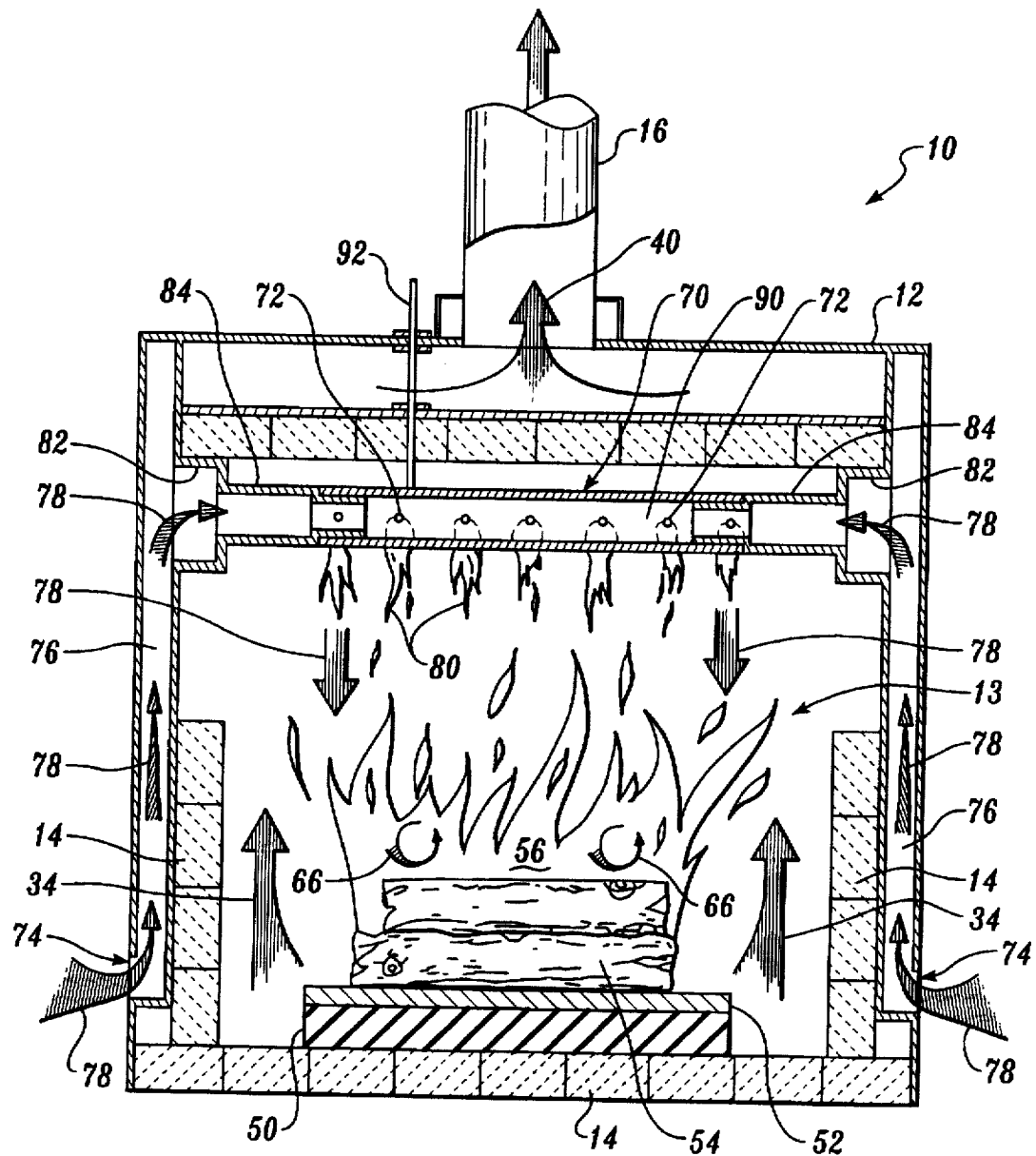
FIG. 1A is a front cutaway view of an embodiment of a wood stove according to the present invention.
Figure 1B:
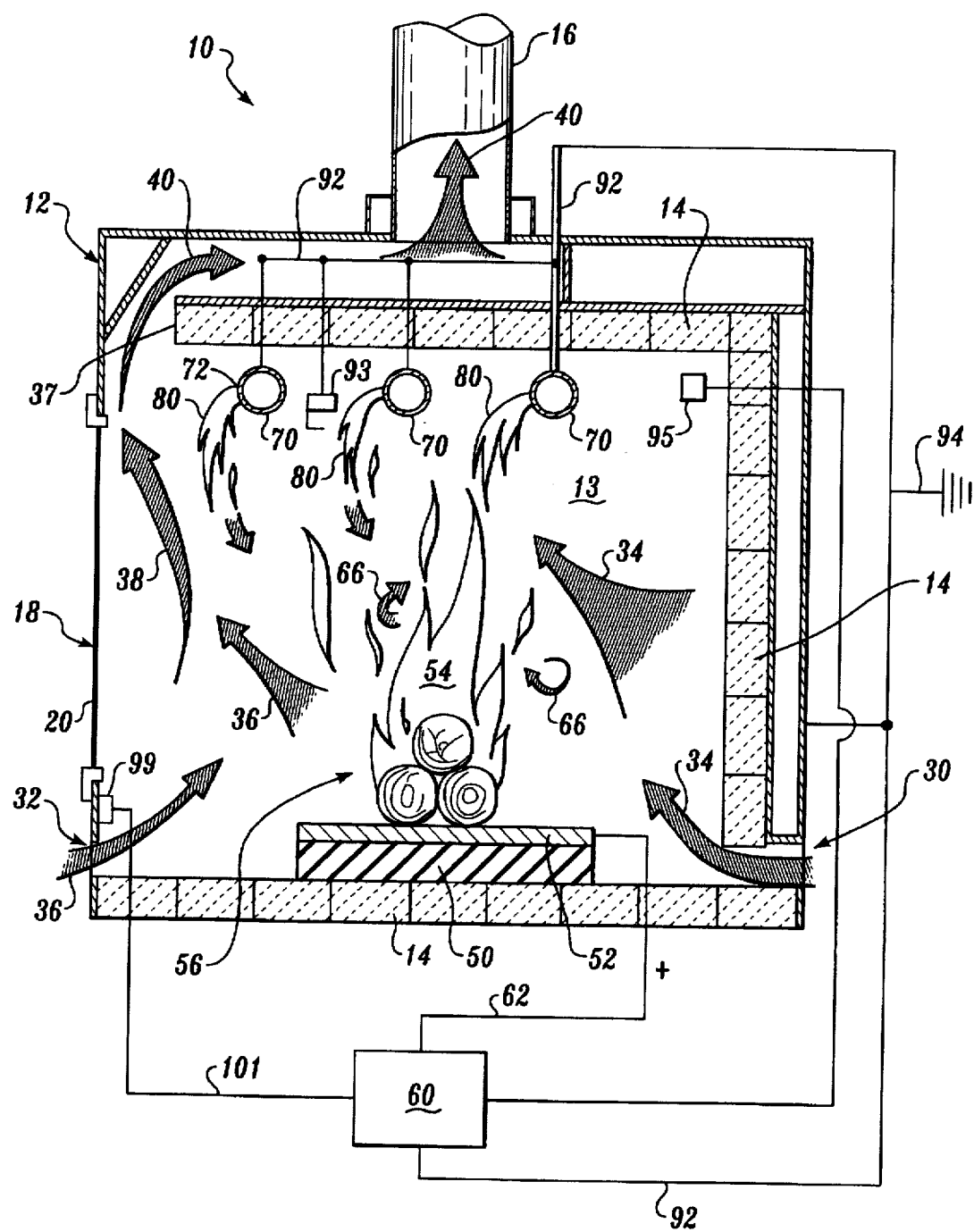
FIG. 1B is a side cutaway view of the wood stove of FIG. 1.

A first embodiment of a pyrolytic type wood stove incorporating the present invention is illustrated in FIGS. 1A and 1B. As discussed in more detail below, pyrolyric wood stoves keep the combustion zone at reduced oxygen levels and at a highly elevated temperature that causes the wood to produce combustible gases. Secondary air is introduced above the combustion zone in order to cause a secondary combustion zone that completes the combustion of the gases produced during combustion.

The wood stove generally designated 10 includes an electrically conductive exterior housing 12 that forms a partially enclosed container around the interior 13 of the wood stove. The interior 13 of the wood stove surrounds the combustion zone generally labeled 56 in which a fuel source 54, such as natural wood logs, Presto® logs, paper logs, coal, et cetera, are burned. The fuel source rests on a grate of nonoxidizing materials able to withstand high temperatures. Preferably, the grate is of a shaker type to facilitate removal of solid combustion residue. The housing 12 is generally of a rectangular box shape and includes a rectangular door 18 that is pivotally mounted on the front of the housing. The door 18 allows a user to place wood into the interior of the stove and to clean the interior of the stove when required.

A glass window 20 (FIG. 1B) is mounted in the center of the door 18. The window 20 allows a user to view the combustion zone 56 thus adding to the stove's aesthetic appeal. The shape, external and internal dimensions of the preferred embodiment are not meant to be limiting and could easily be changed without departing from the scope of the invention.

A series of air inlets 30 and 32 located along the bottom of the front and back of the stove allow primary air to enter the interior 13 of the stove to feed the combustion zone 56. The primary air inlets 30 and 32 could be located at different locations depending upon the design of the stove without departing from the invention. A chimney 16 located approximately in the center of the top of the stove allows exhaust gases produced during the combustion process to exit the stove. The chimney 16 is connected to ducting (not shown) that ducts the exhaust gases out of the dwelling or structure in which the stove is used.

The fuel source 54 is located on an electrode or electrically conductive plate 52 located approximately in the center of the bottom of the stove 10. The conductive plate 52 may be electrically charged or grounded, and if charged is electrically isolated from the housing 12 and the internal structure of the stove through the use of an electrical insulator 50. Electrical insulator 50 is located underneath the plate 52 so that it separates the plate 52 and the housing 12. For reasons discussed below, the electrical insulator 50 should be sufficient to prevent a high voltage electrical potential applied to the plate 52 from flowing between plate 52 and housing 12. Electrical insulator 50 may be formed from an electrically insulative ceramic or another material that is an effective electrical insulator and can withstand the elevated temperatures present in the interior of a pyrolytic wood stove.

Alternative embodiments of the present invention could use other methods to electrically isolate the plate 52 from the rest of the structure of the stove. For example, instead of using a rectangular shaped electrical insulator 50, a series of electrical insulators forming pillars could be located at various points underneath electrical plate 52. Alternately, the floor of the housing 12 could be formed of a material that is not electrically conductive such that it acts as an electrical insulator to prevent electrical potential from flowing from the plate 52 into the conductive part of the housing 12. In other alternative embodiments, the plate 52 could be located directly on top of the firebricks within the stove.

The electrical insulator 50 is located on top of a series of firebricks 14 that cover the floor of the stove 10. Firebricks 14 also line the back, sides, and top of the stove. The firebricks 14 act as additional electrical insulators and also help to increase the heat insulation and the total heat retention mass of the stove.

Primary air to feed the combustion zone 56 enters the interior 13 of the stove through the rear air inlets 30 and the front air inlets 32. The airflow entering the front air inlets 32 flows through the combustion zone 56, as shown by arrows 36. A portion of the front airflow also passes directly upwardly over the interior surface of the window 20, as shown by arrow 38. This front airflow or air wash over the window 20, shown by arrow 38, helps to prevent the buildup of soot or ash on the interior surface of the window 20.

The airflow entering the rear of the stove through rear air inlet 30 passes through the combustion zone 56, as shown by arrows 34. After passing through the combustion zone 56, the combustion residues of the front air, rear air, and air wash flow, as shown by arrows 36, 34, and 38, respectively, and combine to flow out the front edge 37 of the top of the stove as shown by arrows 40. This combustion gas airflow or exhaust gas is then ducted rearwardly to flow out of the stove through the chimney 16 as shown by arrows 40.

This embodiment of stove 10 is a pyrolyric wood stove, thus secondary combustion air is also introduced into the top of the combustion zone 56 to provide additional oxygen to feed the combustion process. The secondary airflow first enters the stove 10 through auxiliary inlets 74 located near the bottom of each side of the stove, as best illustrated in FIG. 1A. The secondary airflow, shown by arrows 78, flows up the sides of the stove through hollow chambers 76 located between the housing 12 and the firebricks 14. In so doing, the air is preheated by contact with the hot firebricks. When the secondary air nears the top of the stove, it flows into a series of three secondary air supply tubes 70. The tubes 70 are mounted near the top of the stove, directly above the combustion zone 56, and pass horizontally from one side of the housing 12 to the opposite side.

Each tube 70 includes an electrically conductive tubular perforated center section 90 (FIG. 1A) that serves as an electrode that is electrically isolated from the housing 12 through the use of two electrically insulating fittings 84 located on either side of the center section 90. One end of each fitting 84 is attached to the interior wall of the housing 12, and the other end of each fitting is attached to the center section 90.

Each center section 90 includes a plurality of outlets or holes 72 (FIG. 1A) that allow the secondary air to flow into the interior 13 of the stove. In the preferred embodiment, the holes 72 are evenly spaced over the length of the tubes 70.

In alternate embodiments, the tubes 70 could be located at alternate locations, or eliminated altogether to produce a standard-type wood stove. In addition to changing the locations of the tubes 70, the locations of the inlets of the primary air and secondary air could also be changed without departing from the scope and intent of the invention. The present invention is applicable to combustion processes in general and is not limited in application to a specific type of wood stove.

In a pyrolytic stove, the high temperatures present in the combustion chamber during operation cause combustible gases to form within the interior 13 of the stove. When exposed to a source of oxygen, such as the secondary airflow, shown by mows 78, entering through holes 72, the gases combusted and sometimes produce auxiliary flames 80 within the combustion chamber. The flames 80 could form at the holes 72, or could form a united flame front extending between the fuel source 54 and the holes 72.

In accordance with the present invention, the combustion zone 56 is electrified with a high voltage electrical potential in order to produce the advantages of the present invention. In the first embodiment, the combustion zone 56 is electrified by placing a positive electrical potential on the conductive plate 52 and by placing a negative electrical potential or grounding the conductive center sections 90 and housing 12. Alternatively, the combustion zone 56 could be electrified by placing a positive electrical potential on the conductive center sections 90 and connecting the conductive plate 52 and housing 12 to a negative potential or ground. In still other embodiments, an alternating electrical potential could be placed on the center section 90 or plate 52.

In still further embodiments, a positive or negative potential could be placed on one of the center sections 90 and an opposite electrical potential could be placed on the adjacent center section 90. These potentials could then be alternated, as further discussed below.

In other embodiments, in addition to or as an alternative to placing a potential on the center sections 90, electrodes could be placed on opposite sides of the combustion zone. These electrodes could pass an electrical field across the combustion zone transverse to the combustion gas flow from the bottom of the stove to the top of the stove. As discussed above, such electrodes could be electrified using a positive, negative, or alternating electrical potential.

Each of the center sections 90 is placed at a positive, negative, or alternating electrical potential, depending upon the application, through the use of electrical leads 92 (FIGS. 1A and B) that extend from the center sections 90, upwardly through the housing 12 and then to a power source 60 or ground 94 depending upon the electrical potential placed on the center section. In the first embodiment, the electrical leads comprise stainless steel rods that pass through ceramic insulators that electrically isolate the housing 12 from the center sections 90.

As discussed above in the Summary of the Invention section, it is theorized, without being bound, that passing an electrical field through the combustion zone 56 causes an increased production of ions, free electrons, and charged particles within the combustion zone. Electrifying the combustion zone also causes increased mixing as schematically represented by arrows 66. This increased production of ions, free electrons, and charged particles and increased mixing reduce the production of particle emissions through a number of mechanisms. Increased mixing of oxygen with combustible reactants causes a more efficient and more complete combustion of the fuel. The increased kinetic energy supplied to the ions, free electrons, and charged particles also helps to break up hydrocarbon molecules in the combustion zone. Improved breakup of hydrocarbon molecules and better mixing with oxygen allow the electrical and chemical nature of the combustion process to more fully consume the hydrocarbons. Application of a high voltage electrical potential to the combustion zone also causes an increase in submicron particle agglomeration and forming of larger particles or clumps of particles.

Application of a high voltage electrical potential to the combustion zone also reduces particle emission and increases heat transfer efficiency by attracting the charged particles within the combustion zone onto the housing or into a separate collection zone. For example, negatively charged free electrons or particles are attracted to an opposite electrical potential. Thus, if the conductive plate 52 or housing 12 is placed at a positive potential, the negatively charged flee electrons and particles are attracted downwardly through the combustion zone and onto the conductive plate 52. This attraction causes the charged particles within the combustion zone to remain in the combustion zone, to be attracted into the combustion zone to be reburned, or to be attracted onto the bottom of the stove into the ash remaining after the combustion process. Similarly, positively charged ions are attracted to a negative electrical potential, thus if the center sections 90 or housing 12 are placed at a negative potential, the positively charged ions or particles are attracted to them.

Alternatively, if a negative potential is placed upon the conductive plate 52 and a positive potential is placed upon the center section 90, then the positively charged ions would be attracted to the plate 52 and the negatively charged particles would be attracted to the center section 90.

Because the flames produced during combustion have an electrical quality, the flames provide an electrical conductive path from the conductive plate 52 to the conductive center section 90, thus completing the electrical circuit. This behavior allows current to flow from the center section 90 through the flames and into the conductive plate 52 or vice versa depending upon the electrical potential applied to the center section 90 and electrical plate 52.

In order to prevent the possibility of electrical shocks to the user, the present invention also incorporates a thermally activated switch 95, shown in FIG. 1B, located within the interior 13 of the wood stove. The thermal switch 95 is electrically connected to the power source 60 via an electrical cable 97. The thermally activated switch 95 is set at an elevated temperature such that the power source 60 does not energize the center sections 90 unless the interior of the stove has reached a preset temperature. The thermally activated switch ensures that the power supply does not produce an electrical field within the stove when it is shut off. In addition to the thermally activated switch 95, the stove also includes an electrical cutoff switch 99 connected between the door 18 and the housing 12. The electrical cutoff switch is also connected to the power source 60 via an electrical cable 101. When the door 18 is opened, the electrical cutoff switch 99 shuts down the power supply 60, thus shutting down the electrical field produced within the interior of the stove so that additional fuel may be added during operation of the stove.

When a wood stove is first started, there may be insufficient flames for the electrical field produced using the invention to act on to fully reduce particle emissions. During this startup time period, it may be beneficial to place a secondary igniter 93 within the interior 13. The secondary igniter could be connected to the power source 60 through the electrical cable 97. The igniter 93 could be used to create sparks in the combustion zone 56 to ignite any combustible gases within the interior 13. The igniter could then be turned off or deenergized when sufficient flames exist in the combustion zone for the electrical field produced at the center sections 90 to act upon. Alternatively, the igniter 93 could be placed at other locations within the stove or multiple igniters could be used.

As discussed above, each individual center section 90 could be placed at a different electrical potential, both in magnitude and in sign. By tailoring the potential on each center section 90, it is possible to steer or guide charged particles in the combustion zone to a desired location. The electrified center sections 90 could be used to drive the charged particles into a collection area or to force them back into the combustion zone so that they may be recombusted.

Figure 2:
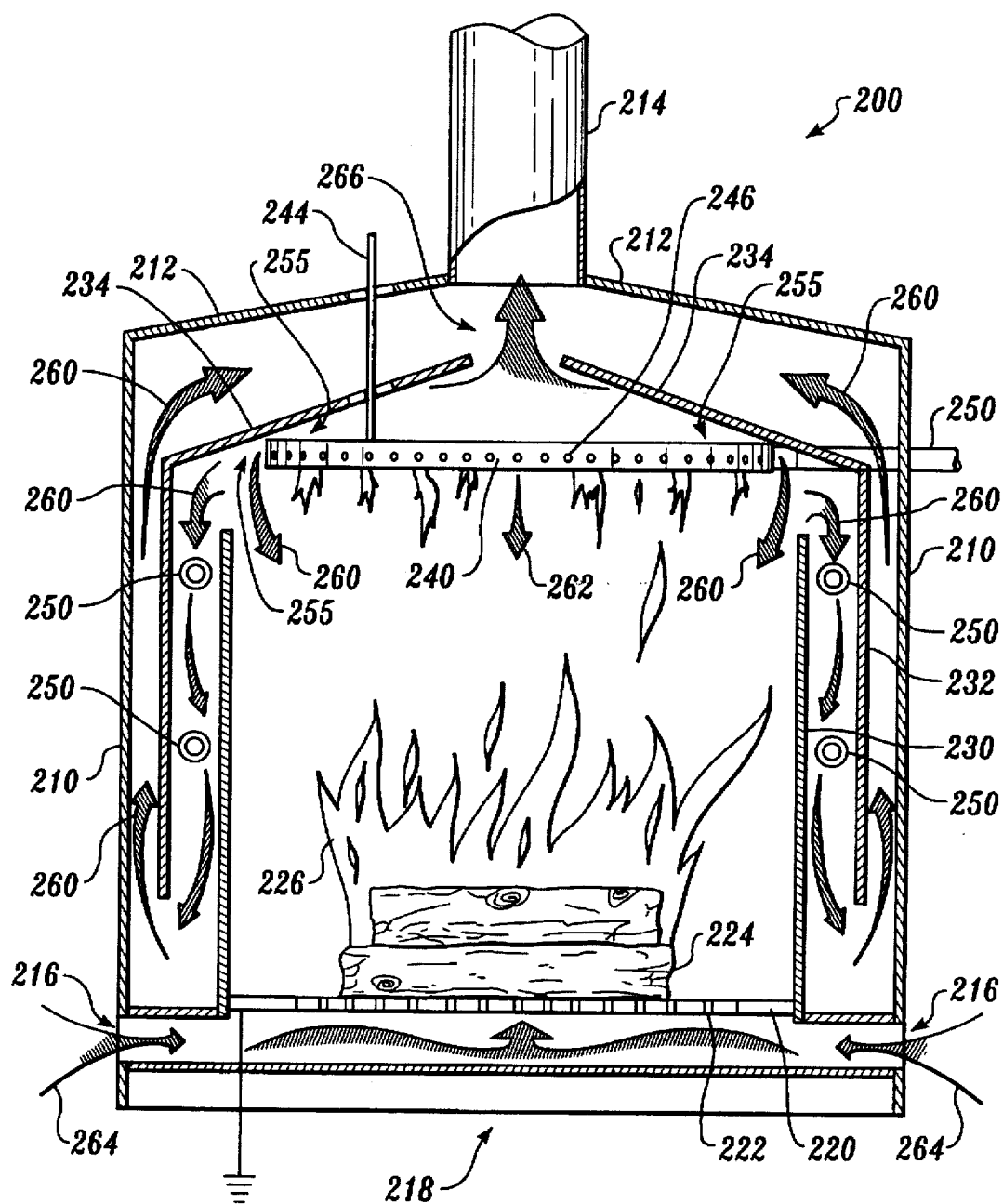
FIG. 2 is a front cutaway view of another embodiment of a wood stove according to the present invention.

An alternative embodiment of a wood burning stove is illustrated in FIG. 2. The stove 200 has a base 218, a surrounding outer shell with vertical walls 210, and an enclosing roof 212 that is peaked upward toward a cylindrical exhaust duct 214 located at the upper center of the roof of the stove. The base 218 of the stove is supplied with primary air inlets 216 that allow inlet air to be drawn into a central combustion zone within the stove. Base 218 that extends horizontal grate 220 that extends horizontally to form the floor of the combustion zone of the stove. As illustrated, logs 224 rest on the grate and burn to produce combustion flames 226. Primary combustion air, indicated by arrows 264, is supplied through inlets 216 into a space within base 218 and below grate 220. Thence the air flows through holes 222 in grate 220 to the combustion flames 226. Internally, the stove is provided with a secondary combustion air preheater. This structure includes a baffle and tube arrangement for transferring heat from gases produced by combustion to secondary air flowing in tubes so that heated secondary air may be provided through a perforated electrically charged electrode in the vicinity of the upper edge of the combustion flames 226. As shown, the combustion zone of the stove is at least partially surrounded by a first baffle wall 230 that extends vertically from the base 218 of the stove upward but short of the roof 212. A second, outer baffle wall 232 is spaced apart from vertical walls 210 and first baffle wall 230 and surrounds the first baffle wall 230. The second baffle wall extends vertically down to stop short of the base to allow fluid passage beneath. A roof portion 234 extends from upper edges of second baffle wall 232 inward and upward over the combustion zone, with a central gap 266 through which combustion gases can flow to the exhaust duct 214. During stove operation, hot combustion gases, shown by arrows 260, are drawn into the space between baffle walls 230 and 232. Secondary air preheater tube 250 is coiled around first baffle wall 230 in the space between baffle walls 230 and 232 so that the combustion gases entering the space flow over the tubes and thereby transfer heat to secondary combustion air carried within the tubes. As indicated before, the space between the second baffle wall 232 and the vertical walls 210 of stove 200 is in fluid communication with the space between baffle walls 230 and 232. Thus, after combustion gases have transferred heat to the secondary combustion air in tubes 250, the now cooler combustion gases enter this space and flow to exhaust duct 214 to exit from the stove. The heated secondary air in tube 250 is charged to electrode 240 that is mounted near an upper edge of the combustion zone, and preferably in touching relation to times in the combustion zone. Preferably, the electrode is in the form of a disc-shaped plenum with air outlet holes 246 at the peripheral edges to allow exit of secondary air. Preferably, the roof portion 234 of the second baffle wall 232 is angled inwardly and spaced above electrode 240 so that perforated peripheral edges of the electrode are in close proximity to interior surfaces of baffle wall 232 and lower portions of roof portion 234. Thus, when secondary air exits from holes 246 and a bluish flame corona effect is observed in zones 255, between the electrode and the baffle wall and roof portions, particle emissions are significantly reduced both by combustion and by repulsion of particles from the electrode and attachment of repelled particles to surfaces near zones 255.

As shown in FIG. 2, electrode 240 has electrically connected thereto an electrode connector 244 that extends through, but is electrically insulated from, baffle wall roof portion 234 and wood stove roof section 212 to a voltage source (not shown). Alternatively, electrical connection may be made to a portion of tube 250 that extends outside the stove. Grate 220 is electrically grounded. Thus, an electrical field is produced in the region between the electrode 240 and the grounded grate 220. According to the invention, this electrical field reduces particulate emissions from combustion processes within stove 200. As explained before, the electrical field is of high strength, sufficient to achieve the desired level of particulate reduction.

Figure 3:
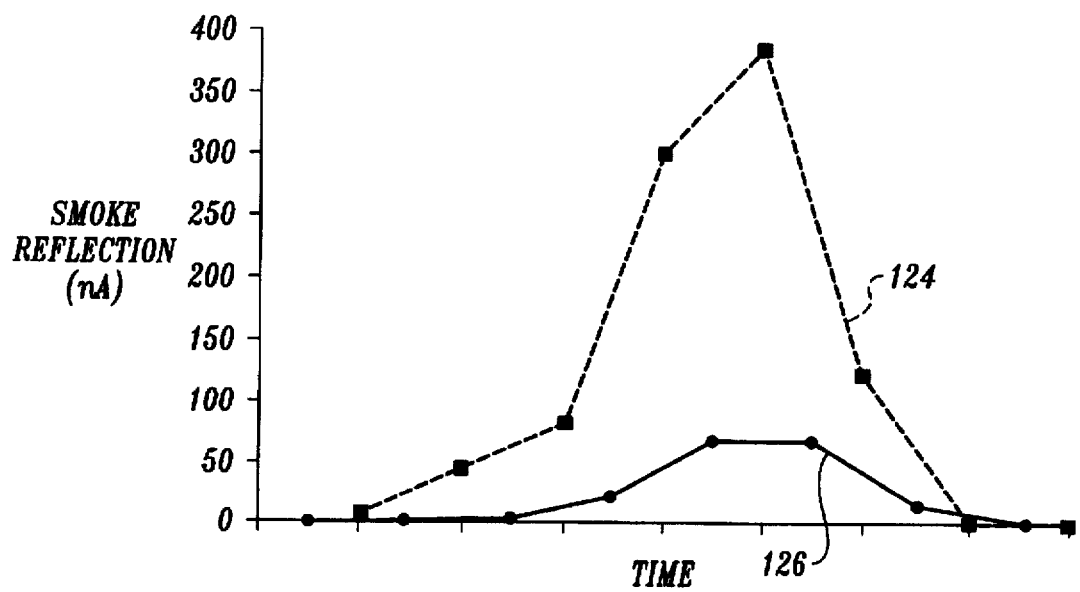
FIG. 3 is a graph of a measurement of smoke reflection produced during combustion versus time, both with and without application of a direct current (DC) high voltage potential, wherein the measurement of smoke reflection is shown along the y-axis and time is shown along the x-axis.

FIG. 3 illustrates the quantitative difference between particle emissions produced by a wood stove both with and without application of a high voltage electrical field, as described above. In FIG. 3, a measurement of smoke reflection of the wood stove's exhaust was plotted along the y-axis, while the time from commencement of combustion was plotted along the x-axis. Thus, the origin of the graph represents the lighting of the fire in the wood stove while the right-hand side of the graph represents the end of the burn. The data of FIG. 3 was developed by cycling between applying no electrical potential to the conductive center section 90 and applying a 5-kilovolt negative electrical potential to the center section 90, which was spaced about four inches from the grounded base.

The line 124 in FIG. 3 represents the particle emissions of the wood stove without the application of a high voltage electrical potential. The line 126 represents the particle emissions from the wood stove while applying a 5-kilovolt negative electrical potential to the center section 90. As evidenced by the results illustrated in FIG. 3, application of the high voltage electrical potential dramatically reduced the quantity of particle emissions throughout the combustion process.

Figure 4:
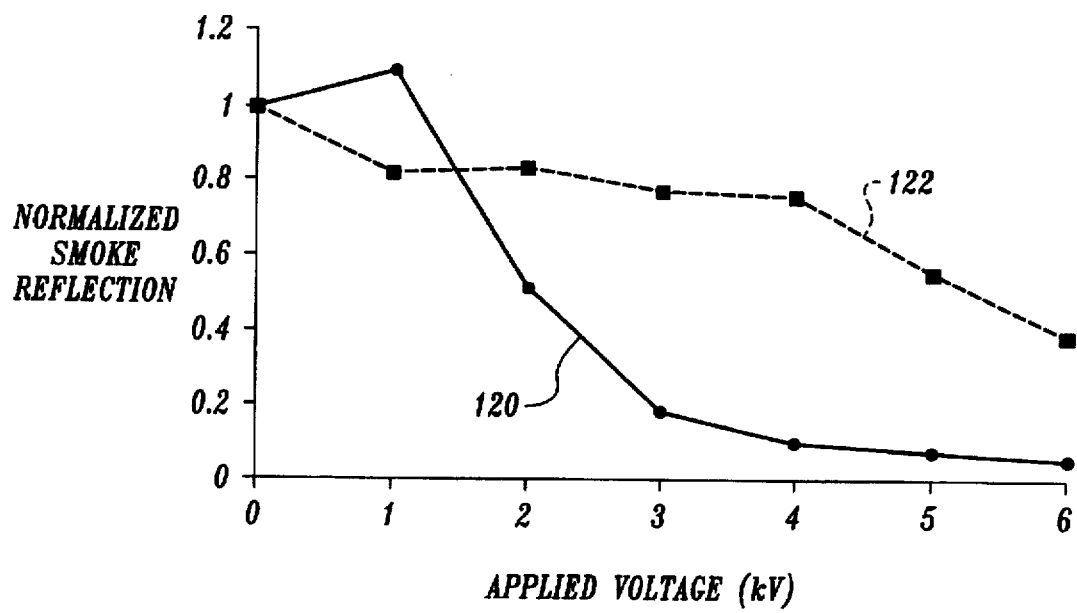
FIG. 4 is a graph of a normalized measurement of smoke reflection produced during combustion versus DC applied voltage, wherein the measurement of normalized smoke reflection is shown along the y-axis and the applied voltage is shown along the x-axis.

FIG. 4 illustrates the effect that applying a high voltage electrical potential to the combustion zone has on particle emissions. In FIG. 4, a normalized measurement of smoke reflection observed at the chimney exhaust is used as a relative measurement of particle emissions and is plotted along the y-axis while the applied voltage in kilovolts is plotted along the x-axis. The normalized measurement of smoke reflection was taken by measuring the light reflected from emissions in the exhaust stack. The normalized measurement of smoke reflection gives a relative measurement of particle emissions but may not be completely accurate due to variations caused by airflow, particle size distribution, sampling size, reflectivity of individual particles, et cetera.

FIG. 4 illustrates the results of two separate embodiments of the invention. In the first embodiment illustrated by line 120, a negative electrical potential was applied to the conductive center section 90. In the second embodiment illustrated by line 122, the same test was performed, only a positive electrical potential was applied to the conductive center section 90. In both embodiments, the conductive plate 52 was grounded and spaced about four inches below the charged electrode. As shown in FIG. 4, as the magnitude of the positive or negative potential in the first and second embodiments was increased, a large reduction in the normalized value of smoke reflection and thus quantity of particle emissions was observed.

The test results shown in FIG. 4 suggest that applying a negative potential to the conductive center section produces better results at the same applied voltage. However, this result may be due to geometrical considerations in the embodiment of the stove tested and results may differ if different geometries are selected. In addition, due to limitations in the test equipment, it was not possible to observe results at potentials higher than 6 kilovolts.

Application of both a positive and a negative potential to the conductive center section 90 resulted in a large reduction in particle emissions. It appears from the test results that an applied electrical potential of over three kilovolts in the application of a negative potential to the center section and of over six kilovolts in the application of a positive potential to the conductive center section produces the best results. It should be noted that the test results may be influenced by stove geometry, the amount of primary and secondary airflow introduced, the intensity of the combustion process, et cetera.

In applications to other embodiments, it may be necessary to experimentally alter stove geometry in order to optimize the reduction of particle emissions. Such experimentation is within the scope of knowledge of one of ordinary skill in the art who has read this disclosure. A few of the factors that may be altered to optimize stove geometry include the placement of the conductive center section 90 relative to the fuel source, placement of the fuel source relative to conductive portions of the housing, et cetera.

Figure 5:
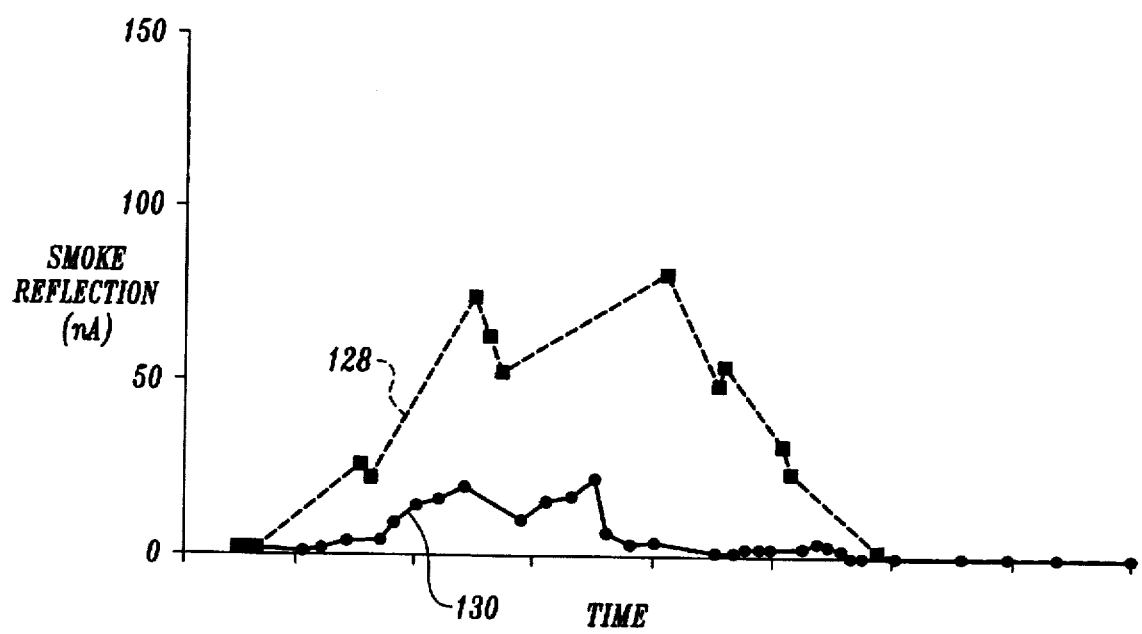
FIG. 5 is a graph of a measurement of smoke reflection produced during combustion versus time, both with and without the application of an alternating current (AC) high voltage potential, wherein the measurement of smoke reflection is shown along the y-axis and time is shown along the x-axis.

The advantages of the present invention may also be produced by applying an alternating (AC) potential to the combustion zone. FIG. 5 was prepared in the same manner as FIG. 3 only a 6-kilovolt RMS AC potential was applied to the conductive center sections 90. In FIG. 5, line 128 shows the particle emissions produced by the wood stove without application of a high voltage electrical potential. Line 130 shows the particle emissions produced by the wood stove during application of a 6-kilovolt RMS AC potential. The results illustrated in FIG. 5 show that an application of an AC potential also produces reductions in particle emissions.

Figure 6:
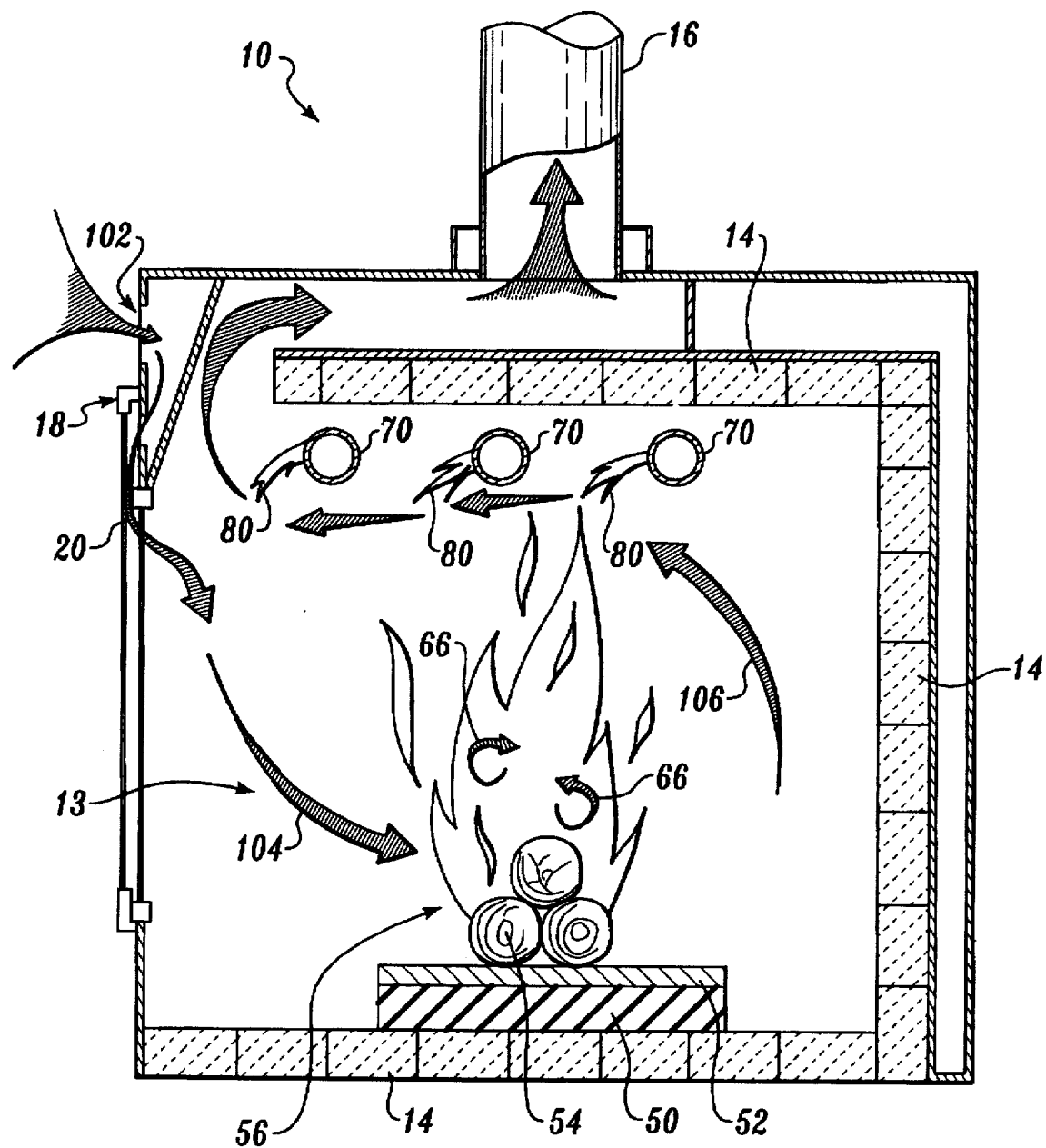
FIG. 6 is a side cutaway view of an embodiment of a wood stove according to the present invention.

FIG. 6 shows another embodiment of a wood stove using the present invention. Features of this alternate embodiment that function in a manner similar to the first embodiment are identified with the same reference numbers as used in the first embodiment and may be understood by reference to the first embodiment.

In the embodiment of FIG. 6, primary air enters the interior 13 of the stove through an inlet 100 located at the top of the stove above the door 18. The primary air flows down into the interior 13 of the stove through a chamber 102, along the interior surface of the window 20. The primary air then flows rearwardly into the combustion zone 56 as shown by arrow 104. The primary airflow then flows upwardly along the rear wall of the stove as shown by arrow 106. Upon reaching the top of the stove, the primary airflow joins the secondary airflow flowing into the interior 13 of the stove through the center sections 90. The combined primary and secondary air then flows out of the interior 13 of the stove through the chimney 16 as shown by arrows 108.

In yet other alternate embodiments, the primary and secondary air could enter the stove at other locations in order to produce different flow paths within the interior of the stove.

Application of the present invention is not limited to stoves, burners, boilers, or incinerators; it may be applied to a range of combustion processes including the reduction of particle emissions from internal combustion engines such as those used in trucks or automobiles. An embodiment of the present invention applied to reduce particle emissions of the exhaust of an internal combustion engine is illustrated in FIG. 7.

The exhaust from the internal combustion engine, or another organic combustion process, enters the invention through an exhaust pipe 150. A fuel supply injector 152 extends through the wall of the exhaust pipe 150 and has its tip aligned with a center of flow of the exhaust pipe. The injector 152 is electrically insulatively mounted to the exhaust pipe 150 through the use of an insulator 154 interposed between the injector and the exhaust pipe 150. The insulator 154 may be formed from any electrically insulating material capable of withstanding the temperatures present in the exhaust pipe 150.

The injector 152 provides fuel, which is ignited to form a combustion flame 156 within the interior of the exhaust tube 150. This combustion flame reburns the particle emissions from the internal combustion engine that flow with the exhaust gases through the exhaust pipe. The combustion flame 156 also works in combination with two electrodes 158 and 162, located on opposite sides of the exhaust pipe 150, so that an electrical field produced between the electrodes will encompass flame 156. Electrode 158 is connected to a voltage source 160 that applies a high voltage, positive electrical potential to electrode 158 while electrode 162 is connected to ground 164. Alternatively, electrode 158 may be connected to a negative electrical potential or to an alternating electrical potential.

Figure 7:
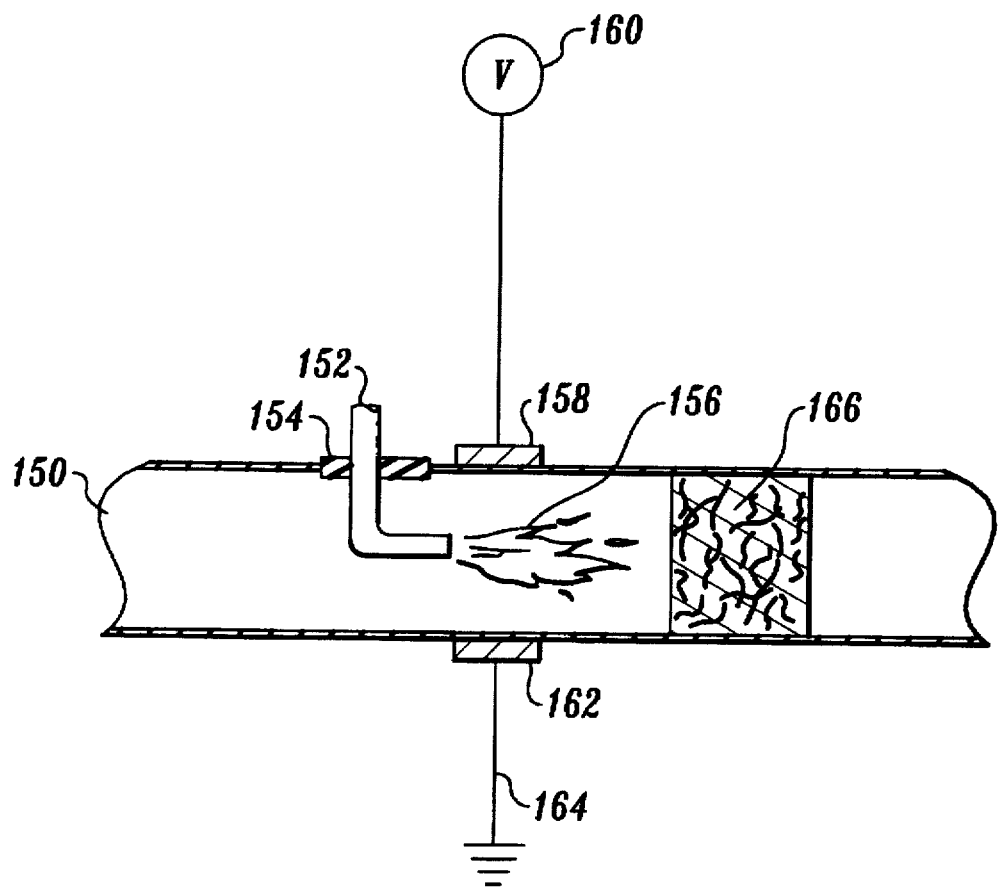
FIG. 7 is a schematic representation of an internal combustion engine exhaust system according to the present invention.

The embodiment of the invention illustrated in FIG. 7 reduces particle emissions in the exhaust gases in a manner similar to that discussed with respect to the embodiment of the present invention used in a wood stove. As particles in the exhaust gases flowing through the exhaust pipe 150 enter the combustion flame 156, the particles are charged and caused to agglomerate under the influence of the flame and the high voltage electrical potential flowing between electrodes 158 and 162 through the electrically charged flame 156. The particles are also maintained within the combustion flame 156 by the attraction of the high voltage electrical potential and are thus more completely consumed by the combustion process in a manner similar to that described with respect to the embodiment of the invention discussed above.

Larger particles and clumps of particles produced by the invention may be removed by a collection filter 166 located downstream from the combustion flame 156. The collection filter 166 may be a mechanical filter, centrifugal separator, electrostatic precipitator, or other type of particle collector.

Figure 8A:
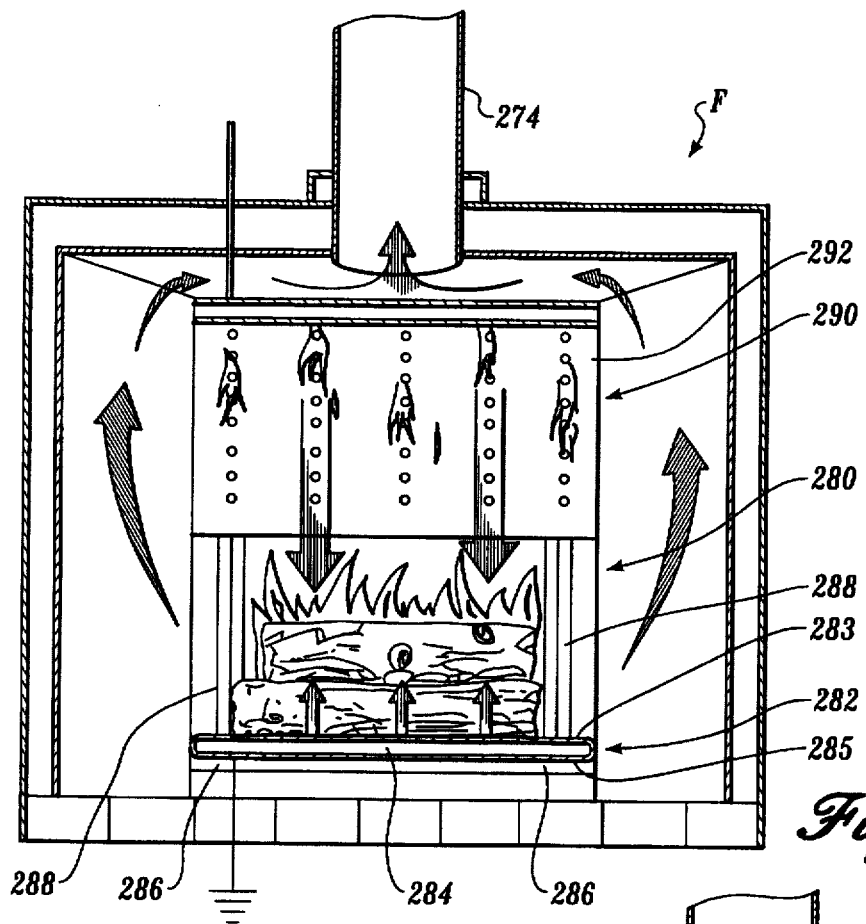
FIG. 8A is frontal view, partially cutaway, showing an embodiment of a fireplace insert according to the invention, installed in a fireplace.
Figure 8B:
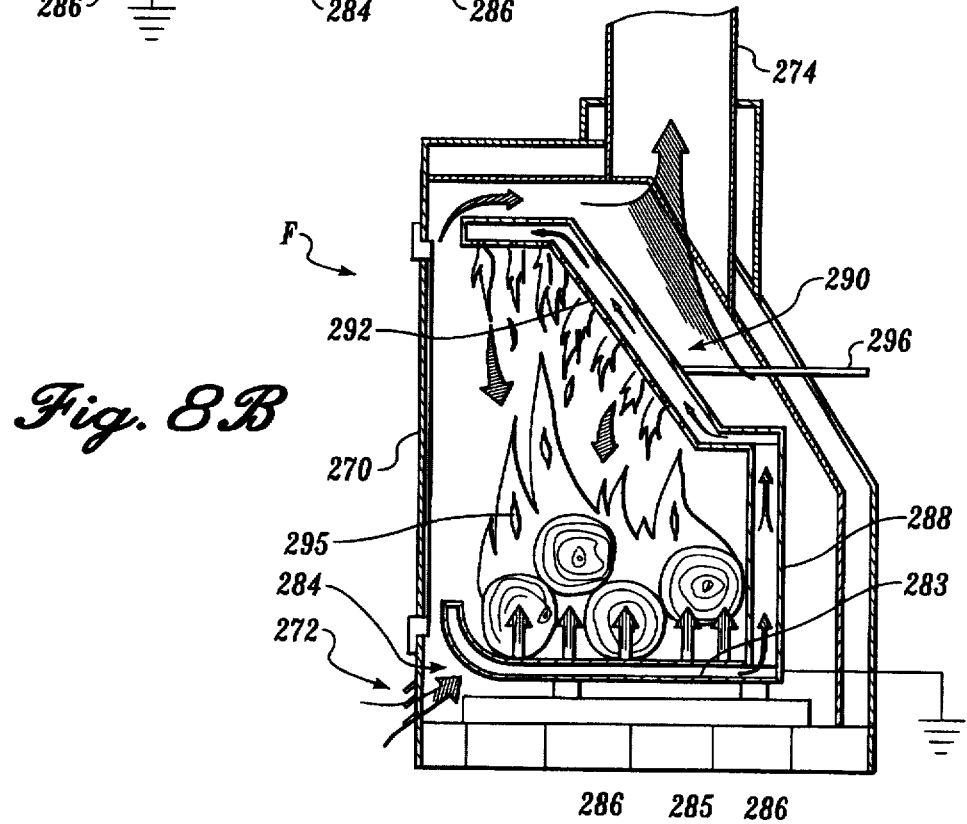
FIG. 8B is a side view of the fireplace insert of FIG. 8A, in partial cutaway, as installed in a fireplace.

An embodiment of a fireplace insert, in accordance with the invention, is shown in FIGS. 8A and 8B. An insert 280 is located within the combustion zone of a fireplace, generally designated F. As is conventional for residential fireplaces, the illustrated embodiment has a frontal glass enclosure 270 that seals the combustion zone from physical contact with the surrounding environment but allows heat to pass through into the room in which the fireplace is located. Near a front base of the fireplace are louvers 272 for controlledly supplying air to the combustion zone of the fireplace. Also, near an upper rearward end of the fireplace, in fluid communication with the combustion zone, is a chimney, or combustion gas exhaust duct, 274 for allowing exit of gases produced by the combustion process. The fireplace insert 280 is configured to conform to the general shape of the combustion space within the fireplace F. Furthermore, the fireplace insert is preferably not permanently mounted in the fireplace, but is removably mounted in the fireplace to facilitate cleaning and repair. In the embodiment shown, the insert 280 has a hollow base 282 in the form of a closed plenum that includes two substantially flat horizontal rectangular steel plates 283, 285, sealingly joined at their peripheral edges, with a hollow fluid space between for receiving air. A front portion of the plenum is preferably curved upward so that an air inlet 284 that extends along the length of the lower frontal surface of lower plate 285 of the base is in fluid communication with air drawn in through louvers 272. The upper plate 283 of the plenum is provided with a plurality of perforations to provide primary combustion air to combustible material placed on or near the top of the base. The base may also be provided with legs 286 to space the lower plate 285 of the base from direct contact with the floor of the fireplace. Two hollow vertical insulative supports 288 are fixedly connected to the upper plate 283 near the rear of the base, with their interior spaces in fluid communication with the fluid space within the plenum of the base portion. The hollow supports provide support for a roof portion 290 mounted atop the supports and extending forward over the base 282 so that a combustion zone is located between the base and the roof. The roof portion includes a plenum of two spaced-apart parallel steel plates, joined sealingly at peripheral edges with an airflow space between. The airflow space is in fluid communication with the interior spaces of the vertical support conduits. Furthermore, the lower plate 292 of the roof plenum is supplied with a plurality of perforations. Thus, air is heated in the plenum of base portion 282 and flows through conduits formed by the hollow supports 288 into the airflow space within the plenum of roof portion 290. The air then exits through these perforations to provide secondary combustion air in the vicinity of the upper edge of flames 295 in the combustion space of the fireplace. The roof is electrically charged to a high voltage, preferably negative although a positive or alternating charge is also effective, through electrical connection via an electrically conductive cable 296 to a power source (not shown). The base 282 is grounded so that a high strength electrical field is formed between the roof and the base encompassing the combustion zone interposed between. According to the invention, this electrical field, preferably in combination with secondary air, supplied as explained above, reduces particulate emissions from the fireplace.

Figure 9A:
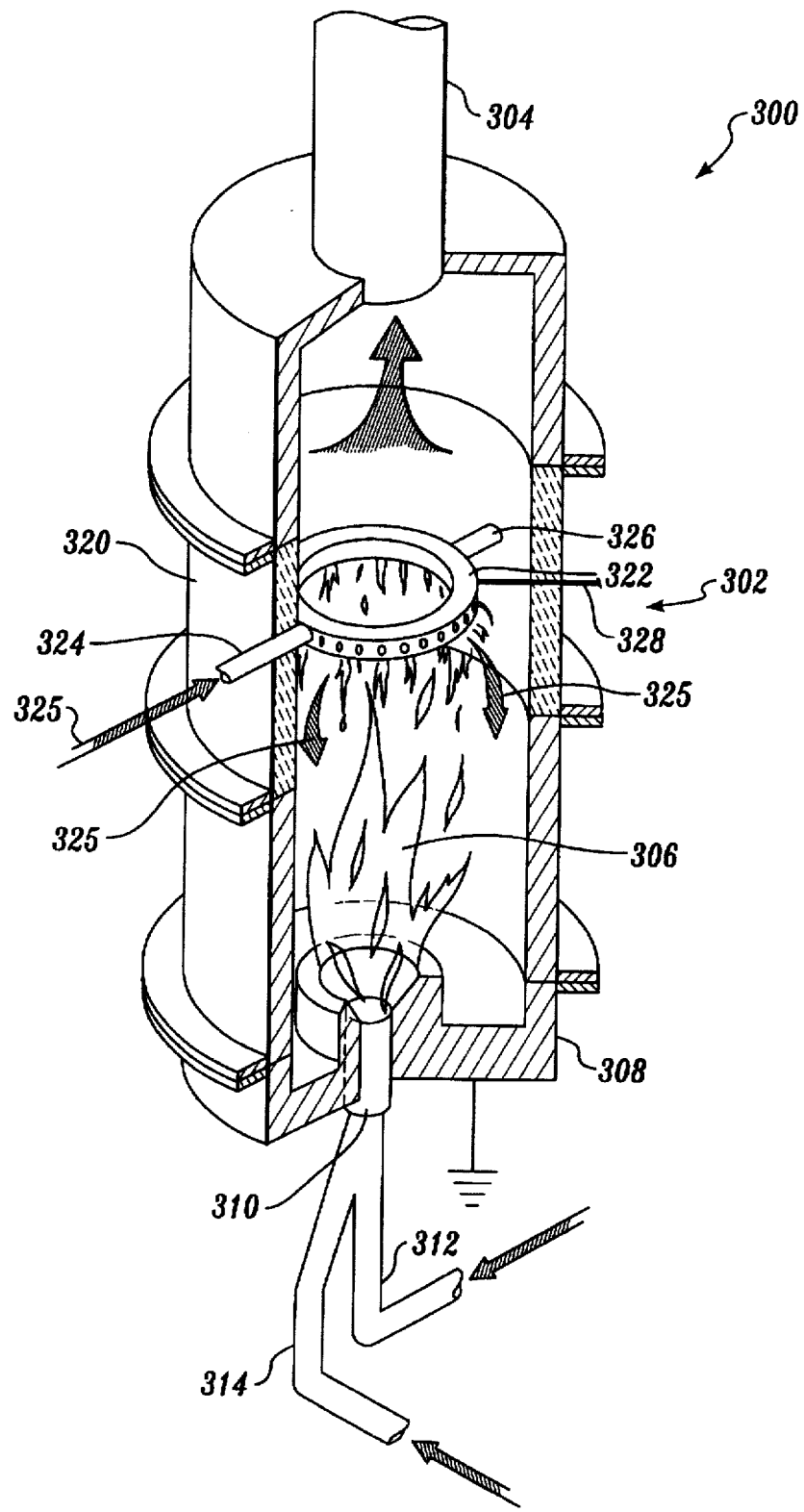
FIG. 9A is an embodiment of a burner according to the invention, shown in partial cutaway perspective view.

In a further alternative embodiment of the invention, a burner is provided that reduces particulate emissions. An embodiment of this burner is shown in FIG. 9A. In general, the burner 300 includes a cylindrical metallic housing 302 of flanged cylindrical sections, for containing the combustion flames 386, a base portion 308, and a flue gas duct 304 at its upper end for exit of combustion gases. The base 308 of the housing is penetrated by a fuel burner 310 that is connected to a primary combustion air conduit and a fuel conduit 314. According to the invention, a section of the cylindrical housing, adjacent an upper extremity of the flames 306 of the combustion zone is replaced with an electrically non-conductive segment 320. An electrode 322, preferably in the form of a hollow circular ring supplied with perforations at its outer circumference, is located concentrically within the replaced segment 324. The electrode is preferably positively charged although an alternating charge or negative charge is also effective. Charge is supplied by electrical connection through cable 328 to a voltage source (not shown). The ring 322 is supplied with secondary combustion air through an inlet conduit 328, and is supported at an end opposite the air inlet conduit by an extension member 326 attached to the wall of the nonconductive segment 320. Thus, the electrically charged electrode is effectively electrically insulated from the grounded base segment 308 of the burner so that a high strength electrical field extends between the electrode and the burner base encompassing the flames of the combustion zone. As a result, the burner produces a reduced level of combustion, as compared to prior an burners that do not incorporate the invention.

Figure 9B:
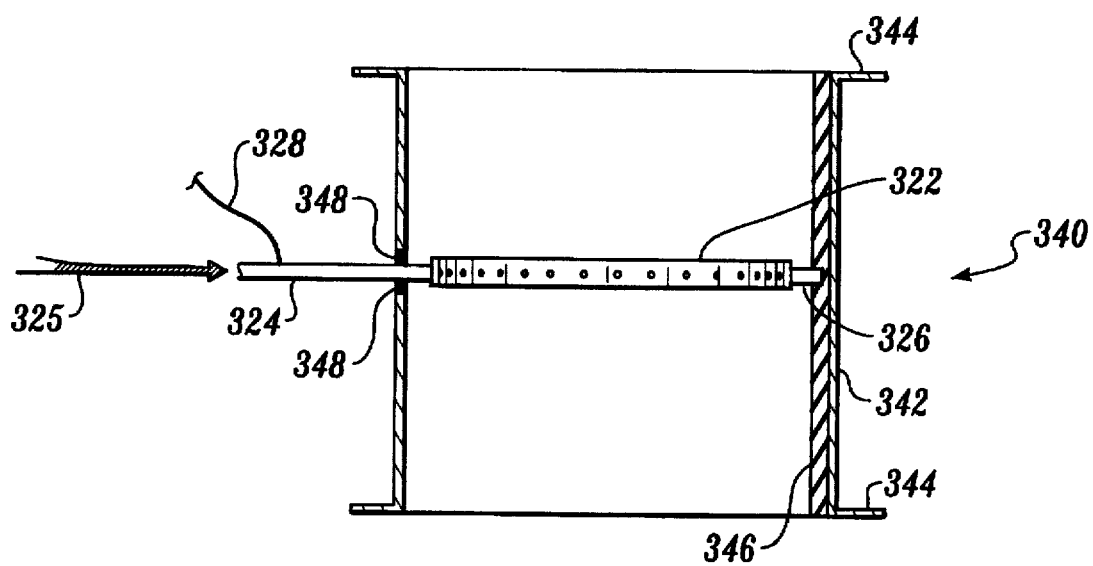
FIG. 9B is an embodiment of an alternative insert of the invention that may be used in conjunction with a burner of the type shown in FIG. 9A.

In an alternative embodiment of a burner of the invention, shown in FIG. 9B, the replacement cylindrical segment 340 has an outer steel cylindrical shell 342 with flanges 344 at either end thereof, as in the original cylindrical segment. However, the internals are different, providing an electrode 322, electrically isolated from the burner base 308 (refer to FIG. 9A), as well as a secondary air supply 325. As before, the electrode is preferably in the form of a hollow circular ring, supplied with perforations at its outer circumference, and is located substantially centrally within segment 340. An air inlet conduit 328 extends through steel wall 342 of the cylindrical segment 340, and is electrically isolated from the steel wall by surrounding electrical insulator 348, for fluidly communicative connection to the interior space of hollow electrode 322. Thus, secondary air 325 entering inlet conduit 328 flows into hollow electrode 322 and exits from the electrode through perforations at the peripheral edges thereof. Hollow electrode 322, located in touching relationship with flames of the combustion zone, is also supported by electrically insulative support 346 located adjacent the metal interior wall of shell 342 of the cylindrical section by an extension member 326 that extends from the electrode to the electrical insulative support. This alternative design allows the use of a metallic cylindrical insert 340 that is more robust and able to withstand impacts than an insert of electrically insulative materials, such as ceramic inserts.

Figure 10:
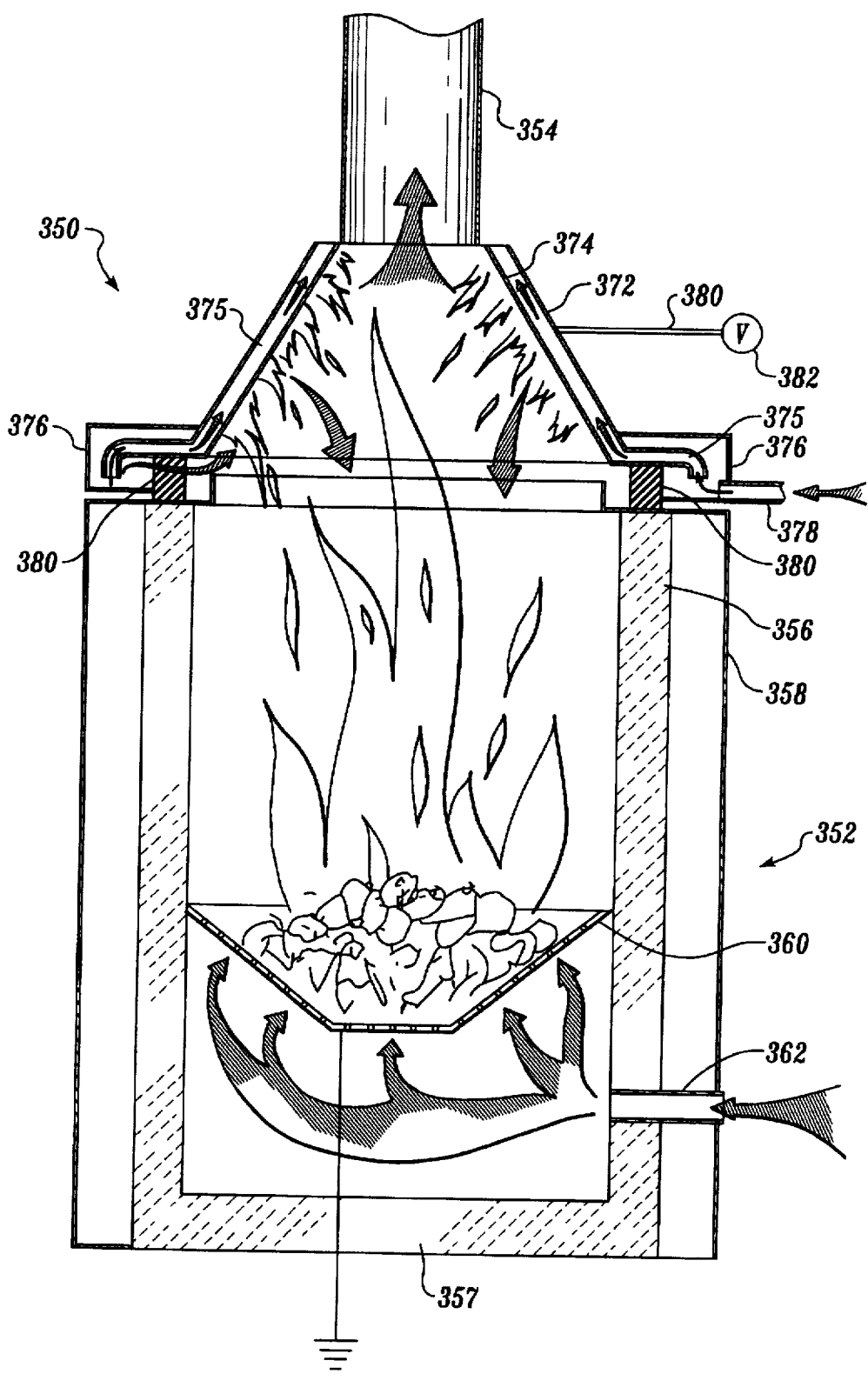
FIG. 10 is a partial cutaway front view of an embodiment of a combustor showing a charged secondary air inlet hood according to the invention.

FIG. 10 illustrates an embodiment of the invention as applied to a combuster, such as the boiler disclosed in U.S. Pat. No. 4,903,616, which is fully incorporated herein by reference. As shown, the boiler has an upwardly open primary combustion chamber 352 that surrounds a combustion zone, and a peaked roof or hood portion 350 mounted atop the chamber and terminating in a flue gas exit duct 354 for removing combustion gases from the boiler. The chamber includes heat resistant and heat insulative surrounding wall 356 and base 357 around the combustion zone. The insulative walls and base are preferably surrounded by a protective steel housing 358. Combustible material is supported on a grate 360, shown as a substantially bowl-shaped perforated plate in the vicinity of a base portion of the interior of the combustion chamber 352. An air inlet 362 penetrates the outer steel housing 358 and insulative brick wall 356 to allow primary combustion air to enter the combustion zone below the plate. The air then enters the combustion zone through the perforations in the plate.

The roof portion 350 is electrically insulated from the primary combustion chamber 352 by electrically nonconductive inserts 380 interposed between these two sections of the boiler. Consequently, while the grate 360 may be electrically grounded, the roof portion 350 may be maintained at a high electrical potential, thereby creating a high strength electrical field extending between the roof portion and the grate encompassing flames in the combustion zone. As illustrated, the roof portion 350 includes two concentric frustoconical shaped plates. The outer plate 372 is sealingly attached at its upper end to concentric inner frustoconical plate 374. The inner plate is supplied with a plurality of holes so that air forced into the space 375 between the frustoconical plates flows through the holes into the secondary combustion zone of the boiler. The lower ends of the nested, frustoconical plates 372 and 374 are enclosed in a surrounding metallic ring 376 that is supplied with an air inlet conduit 378 for receiving pressurized secondary combustion air that is forced from space 375 into the combustion zone. In order to electrically charge the roof portion 350, an electrical cable 386 is connected to the roof portion 350 and provides an electrical potential from a voltage source 382.

According to the invention, as in other embodiments, a high strength electrical field is created between the charged electrode or roof and the grounded base. This electrical field encompasses the flames of the combustion zone and thereby reduces particulate emissions from the boiler.

Alternate embodiments of the present invention could also be used to reduce particle emissions from Dutch ovens used to incinerate waste wood from the pulp and paper industry. In the alternate embodiments, high voltage potentials could be applied to electrodes within the primary or secondary combustion chambers in the Dutch ovens. These electrodes create an electrical field passing through the combustion zone, thus resulting in the advantages described above with respect to the embodiments of the present invention.

As will be appreciated from the foregoing description of the preferred embodiments of the invention, the invention provides a combustion apparatus with reduced particle emissions and methods for reducing particulate emissions from combustion processes. The invention is generally applicable to any combustion apparatus with a combustion zone that is at least partially enclosed with a housing. According to the invention, a high strength electrical field is provided across the combustion zone between a charged electrode located at a first outer edge of the combustion zone, in touching relation to flames of the combustion zone, and a grounded electrode located at a second, opposite outer edge of the combustion zone. Preferably, secondary air is supplied in the vicinity of the electrode that is closest to the upper periphery of the flames of the combustion zone, i.e., nearest the secondary combustion zone. As discussed above, in preferred embodiments this electrode may be hollow, thereby providing a conduit for the secondary combustion air.

While the preferred embodiments of the invention has been illustrated and described, it will be appreciated that various changes can be made therein without departing from the spirit and scope of the invention.

The embodiments of the invention in which an exclusive property or privilege is claimed are defined as follows:

1. A method of reducing particle emissions from a combustion process, the method comprising:
 (a) combusting a fuel source with primary and secondary air to produce a combustion flame within a combustion zone;
 (b) applying a high voltage electrical field between a pair of electrodes through the combustion zone to reduce the amount of particles leaving the combustion zone, wherein one of the pair of electrodes is a hollow electrode located in touching relationship to flames of said zone; and
 (c) supplying the secondary air through perforations in the hollow electrode to the combustion zone.

2. The method of claim 1, wherein the applying step further comprises applying an alternating potential electrical field to the combustion zone.

3. The method of claim 1, wherein the combusting step includes combusting a fuel source selected from the group consisting of wood logs, wood pellets, natural gas, propane gas, wood pulp, coal, kerosene, heating oil, and organic waste products.

4. The method of claim 1, further comprising the step of using the high voltage electrical field to force particles produced during combustion of the fuel source into at least one of the flame and a collection chamber.

5. The method of claim 1, wherein the applying of step (b) further comprises applying a high voltage electrical field of greater than 150 V/cm.

6. The method of claim 1, wherein the combusting step comprises combusting a fuel source in an exhaust gas outlet conduit conveying exhaust gas from a prior combustion process.

7. The method of claim 1, further comprising supplying secondary combustion air to the combustion zone in the vicinity of the electrode at a periphery of the combustion flame.

8. A method of reducing particle emissions from a combustion process, the method comprising the steps of:
 (a) combusting a fuel source with primary and secondary air to produce a flame in a combustion zone;
 (b) applying a high voltage electrical potential to an electrode mounted at a periphery of the combustion zone and in touching relation with the flame, to subject the flame to an electrical field; and
 (c) supplying the secondary air to the combustion zone in the vicinity of the electrode;
 whereby the applying of the field and the supplying of air reduces particulate emissions in the size range about 0.1 to about 3 microns from the combustion zone by from about 50 to about 60 wt %.

9. A combustion apparatus having reduced particulate emissions, the apparatus comprising:
 (a) a housing for containing a combustion zone, the housing having an opening to admit primary combustion air to combust a fuel in the housing, the housing containing disposed therein:
  (i) a first perforated hollow electrode, shaving a first internal space, located on one side of the combustion zone;
  (ii) a second hollow electrode, on an opposite side of the combustion zone from the first electrode, the second electrode having a second internal space in fluid communication with the first internal space; and (b) means for generating an electrical field between the first and second electrodes of at least about 150 V/cm.

10. Twice a combustion apparatus having reduced particle emissions from a combustion process in a combustion zone, the apparatus comprising:

(a) an electrically grounded portion comprising a plenum supplied with an inlet for receiving inlet air and outlet holes for supplying primary combustion air to the combustion zone, the grounded portion located in the vicinity of a first outer edge of the combustion zone;

(b) hollow electrode located near a second outer edge of the combustion zone, on an opposite side of the first outer edge of the combustion zone, the electrode comprising a hollow body portion in fluid communication with the plenum, the body portion perforated to provide secondary combustion air to the combustion zone; and (c) a high voltage electrical field between the electrode and the grounded portion, the field passing through the combustion zone.

11. The apparatus of claim 10, further comprising a hollow electrically nonconductive support extending from the plenum to the electrode, hollow space in the support forming a conduit conveying air from the plenum to the body of the electrode.

12. The apparatus of claim 11, wherein the electrically grounded portion, the electrode, and the hollow support comprise a removable insert for a fireplace.

13. The apparatus of claim 10, wherein the electrode comprises a secondary air supply conduit located to supply air to flames near an upper edge of the combustion zone.

14. The apparatus of claim 13, wherein the electrically grounded portion is located below the combustion zone.

15. The apparatus of claim 13, wherein the electrode is located sufficiently near portions of interior surfaces of a housing surrounding the electrode and the electrically grounded portion so that the electrical field forces at least some particulates to migrate to and adhere to the portions.

16. The apparatus of claim 10, wherein the electrode comprises a circular conduit supplied with an air supply conduit to provide air to hollow space within the circular conduit, and holes in the circular conduit provide secondary air to the combustion zone.

17. The apparatus of claim 16, wherein the circular conduit is located near an upper edge of times in the combustion zone and the electrically grounded portion is located below the combustion zone.

* * * * *

UNITED STATES PATENT AND TRADEMARK OFFICE
CERTIFICATE OF CORRECTION

PATENT NO. : 5,702,244
DATED : December 30, 1997
INVENTOR(S) : D.B. Goodson et al.

It is certified that error appears in the above-indentified patent and that said Letters Patent is hereby corrected as shown below:

| COLUMN | LINE | |
|---|---|---|
| 18 (Claim 9, | 63 line 7) | "shaving" should read --having-- |
| 19 (Claim 10, | 6 line 1) | "Twice a combustion" should read --A combustion-- |
| 20 (Claim 17, | 22 line 2) | "times" should read --flames-- |

Signed and Sealed this

Twenty-first Day of April, 1998

Attest:

BRUCE LEHMAN

*Attesting Officer*     *Commissioner of Patents and Trademarks*